Aug. 29, 1967 W. R. HOHMANN 3,338,293
AUTOMOBILE WINDSHIELD PROTECTING DEVICE
Filed Aug. 16, 1965
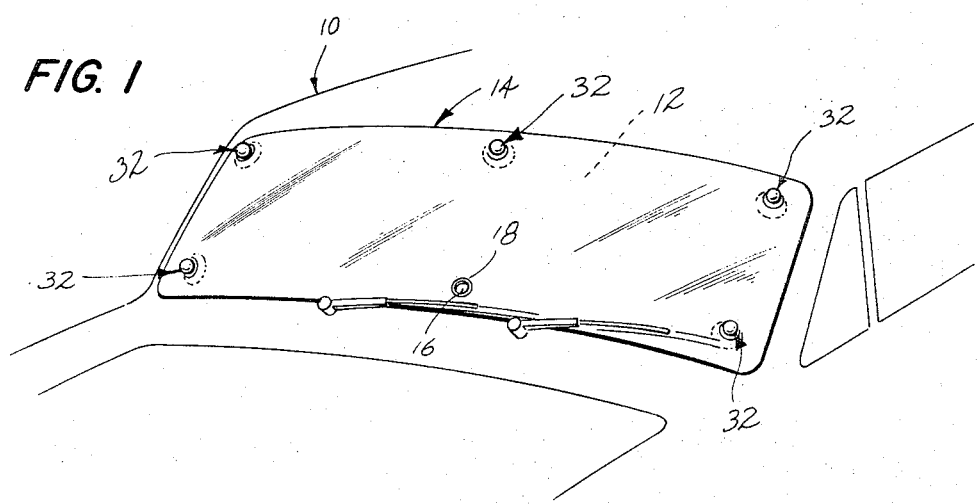
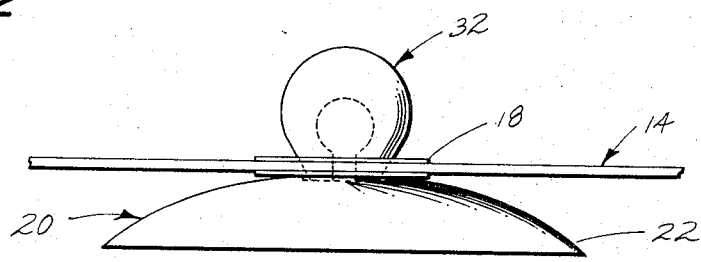
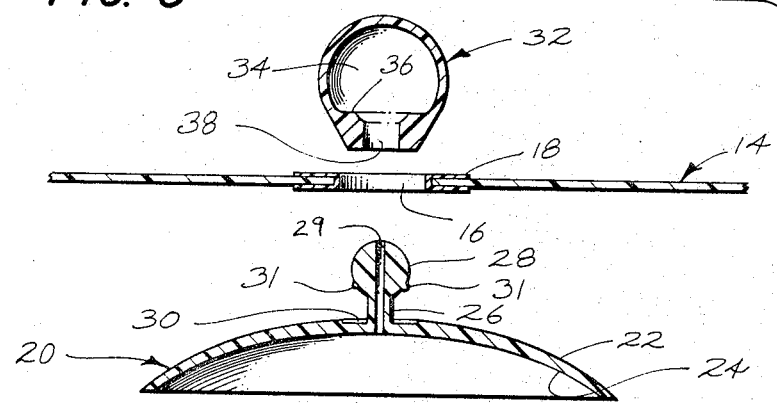
INVENTOR.
WILLIAM R. HOHMANN
BY
*Peter L. Costas*
ATTORNEY

United States Patent Office 3,338,293
Patented Aug. 29, 1967

3,338,293
AUTOMOBILE WINDSHIELD PROTECTING
DEVICE
William R. Hohmann, Hartford, Conn.
(21 Olive St., New Britain, Conn. 06051)
Filed Aug. 16, 1965, Ser. No. 480,030
8 Claims. (Cl. 160—368)

This invention relates to an automobile windshield protecting device, and more particularly to a detachable cover for a windshield.

It is desirable to have a protective device or cover for windshields of automobiles that are left exposed to the elements, particularly during periods of heavy frost, freezing rain or snow. In this manner, difficulties in cleaning the windshield can be minimized. Various materials have been employed for this purpose including canvas, paper, cloth and synthetic plastic materials. However, it is also essential to optimum effectiveness that the sheet material be secured on the windshield against displacement by the wind or the weight of ice and snow.

It is an object of this invention to provide a novel and highly effective windsield protecting device employing a relatively inexpensive cover of synthetic plastic material for protecting the windshield of an automobile against the accumulation of frost, freezing rain or snow.

It is also an object of this invention to provide such a windshield protecting device that utilizes a plurality of readily and firmly engageable suction cups for attaching the cover to the windshield so that the device may be readily attached and removed therefrom.

A specific object is to provide such a protecting device wherein the suction cups are of a novel construction enabling facile but firm engagement upon the windshield and firm retention of the cover thereto.

Other objects and advantages will be readily apparent from the following detailed specification and the attached drawing wherein:

FIGURE 1 is a fragmentary perspective view of an automobile body with a front windshield having a windshield protecting device embodying the present invention attached thereto:

FIGURE 2 is a fragmentary side elevation view of the windshield protecting device of FIGURE 1 to a greatly enlarged scale; and FIGURE 3 is an exploded view in section of the windshield protecting device shown in FIGURE 2.

It has now been found that the foregoing and related objects and advantages can readily be attained in an automobile windshield protective device having a windshield cover of relatively flexible sheet material with a plurality of apertures about the periphery thereof and adapted to substantially overlie an automobile windshield. A plurality of suction cups each having a vacuum-forming portion at one end thereof with a cavity therein are adapted to be disposed against the windshield, and knob portions on the suction cups are disposed in the apertures of the cover. The suction cups each have an air passage communicating between the cavity of the vacuum-forming portion and the other end thereof, i.e., the outer end of the knob portion. A hollow, resiliently deformable attaching member on each of the suction cups has an aperture therein which firmly seats the knob portion of the suction cup therein in substantially air-tight relationship. The hollow attaching member is compressible to expel air therefrom and is thereafter expandable for evacuating a portion of the air in the vacuum-forming portion through the air passage to apply the suction force. The attaching member is readily engageable and disengageable from the knob portion for securing the windshield cover over the knob portion of the suction cups.

In its preferred aspect, the windshield protecting device has a cover of a relatively flexible synthetic plastic sheet material that may be cut to conform to the dimension of the windshield of automobiles and has a plurality of apertures near the periphery thereof. The cover has grommets or reinforcing rings attached thereto about the apertures to prevent the plastic sheet material from tearing. Each suction cup is of a generally circular cross section and has a dome-like end portion with a convex and concave sides providing the vacuum-forming portion with its cavity, and a knob and stem portion extending upwardly from the central portion of the convex side. A central air passage passes through the knob and stem portion for communication with the cavity in the concave side of the suction cup.

In the convex side of the suction cup adjacent to and extending about the stem portion is a generally ring-shaped seating groove formed in the dome-like vacuum-forming portion and the knob portion has a circular retaining bead formed thereon adjacent the vacuum-forming portion. A resiliently deformable bulb-like attaching member, which is generally spherically shaped, is retained on each suction cup and has an aperture for the seating therein of the knob and stem portions of the suction cup in air-tight relationship. A shoulder portion about the aperture of the attaching member is configured to conform to and cooperate with the exterior surface of the stem and a portion of the knob so that a substantially airtight joint is formed therebetween. The attaching member also seats into the seating groove in the convex side of the suction cup to form an additional substantially airtight seal, and the retaining bead on the knob portion engages the shoulder portion of the attaching member for holding the two members together.

The plastic cover may be attached to an automobile windshield by placing the suction cups on the windshield and inserting the knob portions through the reinforcing rings of the plastic sheet material cover. The deformable attaching member is first compressed so that the air within the hollow chamber is expelled and then it is placed over the knob and stem portion of the suction cup and released. A reduction in pressure is created in the chamber of the resiliently deformable member as it expands to its original shape thereby creating a reduction in pressure in the concave portion of the suction cup by evacuating the air therein through the air passage and thereby securing the suction cup and plastic sheet cover to the windshield. The outside diameter of the widest portion of the attaching member is greater than the inside diameter of the reinforcing rings of the cover so that the cover is thereby retained on the suction cups against dislocation by the wind, the weight of ice, etc.

The cover may be removed rapidly and easily from the windshield by removing the resiliently deformable attaching members from the knob and stem portion of the suction cups so that air is free to enter the air passage and eliminate the partial vacuum formed in the concave portion. The suction cups are thereby released from attachment to the windshield and may be removed and stored for reuse.

The suction cup and attaching member may be made of resiliently deformable materials such as rubber or synthetic plastic materials such as butadiene that have a tendency to assume their original shape after having been deformed.

Referring now in detail to the attached drawings, an automobile generally designated by the numeral 10 has a front windshield 12 which is overlaid by a flexible cover generally designated by the numeral 14, desirably fabricated from a transparent synthetic plastic sheet material. The cover 14 has a plurality of apertures 16 adjacent and spaced about the periphery thereof and grommets or reinforcing rings 18 about the apertures 16 to protect the sheet material from being torn.

Mounted on the windshield 12 are suction cups generally designated by the numeral 20 each having a dome-like or vacuum-forming portion at one end thereof and a generally circular cross-section with an upper or convex side 22 and a lower or concave side 24. Extending upwardly from the central portion of the convex side 22 is a generally cylindrical stem portion 26 which terminates in a generally spherical knob portion 28. A central cylindrical air passage 29 is formed in the stem portion 26 and the knob portion 28 to communicate with the cavity defined by the concave side 24 of the vacuum-forming portion. A seating groove 30 is formed adjacent the stem portion 26 on the convex side 22 or the vacuum-forming portion and a retaining bead 31 is formed around the lower portion of the knob 28.

Secured on each suction cup 20 is a hollow, resiliently deformable bulb-like attaching member generally designated by the numeral 32 which is of generally spherical shape. The attaching member 32 has an interior chamber 34 and an aperture 38 which communicates with the interior chamber 34. The shoulder portion 36 about the aperture 38 is configured to conform to and cooperate with the outside dimensions and configurations of the stem 26 and the lower portion of the knob 28 for forming a substantially air-tight connection therewith. The seating groove 30 in the convex side 22 of the vacuum-forming portion receives the end of the attaching member 32 and forms an additional substantially air-tight seal. To aid in retaining the attaching member 32 on the suction cup 20, the retaining bead 31 on the knob portion 28 abuts against the shoulder portion 36.

The plastic sheet 14 is attached to the windshield 12 of automobile 10 by holding the suction cup 20 on the windshield 12 and placing the reinforcing ring 18 over the knob portion 28. The deformable attaching member 32 is first manually squeezed or compressed so that most of the air within the hollow chamber 34 is expelled, and then the attaching member 32 is placed over the knob 28. The pressure is then released and the attaching member expands to its original shape to create a partial vacuum within the chamber 34 which evacuates some of the air from the concave or vacuum-forming portion 24 of the suction cup 20 to create a partial vacuum therein, thus causing the suction cup 20 to adhere to the windshield. The width of the widest portion of the attaching member 32 is greater than the inside width of the reinforcing ring 18 so that the cover 14 is retained on the windshield 12 by the suction cup 20 when the attaching member 32 is engaged thereon.

The cover 14 may be removed from the windshield 12 by pulling the attaching member 32 off the knob portion 28 and stem portion 26 so that air is free to pass through the air passage 29 and to eliminate the partial vacuum in the cavity of the concave portion 24. The suction cups 20 are thus easily released from the windshield 12 without the inconvenience of prying loose a conventional suction cup.

Accordingly, it can be seen that a windshield protecting device is provided which utilizes a plurality of readily engageable suction cup devices for attaching rapidly and firmly an inexpensive sheet material cover to the windshield. The novel construction of the suction cup device provides a device that may be easily secured to a windshield without additional attachments and may be easily removed without the inconvenience of removing a conventional suction cup.

Having thus described the invention, I claim:

1. An automobile windshield protective device comprising: a windshield cover of relatively flexible sheet material having a plurality of apertures about the periphery thereof and adapted to substantially overlie an automobile windshield; a plurality of suction cups each having a vacuum-forming portion at one end thereof with a cavity therein adapted to be disposed against the windshield and a knob portion disposed in an aperture of said cover, said suction cups each having an air passage communicating between the other end thereof and the cavity of said vacuum-forming portion; and a hollow, resiliently deformable attaching member on each of said suction cups, said attaching member having an aperture therein firmly seating the knob portion of the suction cup therein in substantially air-tight relationship, said attaching member being compressible to expel air therefrom and expandable for evacuating a portion of the air in said vacuum-forming portion through said air passage and being engageable and disengageable from said knob portion for securing said windshield cover to said suction cups.

2. The automobile windshield protective device of claim 1 wherein said suction cups and attaching members are fabricated from synthetic plastic material.

3. The automobile windshield protective device of claim 1 wherein each of said suction cups has a stem portion supporting said knob portion on said other end thereof, with said air passage communicating between said knob portion and said cavity of said vacuum-forming portion; and wherein each of said attaching members has an interior shoulder portion forming said aperture therein and firmly seating said stem and knob portion of the suction cup therein in substantially air-tight relationship.

4. The automobile windshield protective device of claim 1 wherein the width of a portion of said attaching members is greater than the width of said apertures in said windshield cover.

5. An automobile windshield protective device comprising: a windshield cover of relatively flexible sheet material having plurality of apertures about the periphery thereof and adapted to substantially overlie an automobile windshield; a plurality of reinforcing rings attached to said cover about said apertures; a plurality of suction cups each having a generally circular cross-section, a vacuum-forming portion at one end thereof with a cavity therein adapted to be disposed against the windshield, and a stem portion and a knob portion disposed in an aperture of said cover, said suction cups each having an air passage communicating between said knob portion and the cavity of said vacuum-forming portion; and a hollow, resiliently deformable bulb-like attaching member on each of said suction cups having a portion with an outside width greater than the inside width of the said reinforcing rings, said attaching member having an aperture therein firmly seating the knob and stem portions of the suction cup therein in substantially air-tight relationship, said attaching member being compressible to expel air therefrom and being expandable for evacuating a portion of the air in said vacuum-forming portion through said air passage and being engageable and disengageable from said stem and knob portion for securing said windshield cover to said suction cups.

6. An automobile protective device comprising: a windshield cover of relatively flexible sheet material having a plurality of apertures about the periphery thereof and adapted to substantially overlie an automobile windshield; a plurality of reinforcing rings attached to said cover about said apertures; a plurality of suction cups each having a concave portion at one end thereof forming a vacuum cavity adapted to be disposed against the windshield, and a convex portion on the other end thereof having a knob and a stem portion disposed in an aperture of said cover, said suction cups each having an air passage communicating between said knob portion and vacuum cavity; and a hollow, resiliently deformable bulb-like attaching member on each of said suction cups having a portion with a width greater than the width of said reinforcing rings, said attaching member having an interior shoulder portion forming an aperture therein firmly seating the knob and stem portion of the suction cup therein in substantially air-tight relationship, said attaching member being compressible to expel air therefrom and being expandable for evacuating a portion of the air in said vacuum cavity through said air passage and being engageable and disengageable from said stem and knob portion securing said windshield cover to said suction cups.

7. The protective device of claim 6 wherein said cover is fabricated of a transparent synthetic plastic sheet material.

8. A suction cup device for attaching a member to a generally planar support surface comprising: a suction cup member having a concave portion at one end thereof forming a vacuum cavity adapted to be disposed against the generally planar support surface, and a knob portion on the other end thereof, said suction cup having an air passage communicating between said knob portion and said vacuum cavity; and a hollow, resiliently deformable attaching member on said suction cup having an interior shoulder portion forming an aperture therein firmly seating the knob portion of the suction cup therein in substantially air-tight relationship, said attaching member being compressible to expel air therefrom and being expandable for evacuating a portion of the air in said vacuum cavity through said air passage and being engageable and disengageable from said knob portion.

References Cited
UNITED STATES PATENTS

| | | | |
|---|---|---|---|
| 1,178,147 | 4/1916 | Gardner | 248—363 X |
| 1,518,943 | 12/1924 | Story | 248—206 |
| 1,859,893 | 5/1932 | Ritz-Woller | 248—206 |
| 2,319,726 | 5/1943 | Duggan | 248—206 |
| 2,451,194 | 10/1948 | Braun | 248—206 |
| 2,551,052 | 5/1951 | Quish et al. | 160—368 |
| 3,042,958 | 7/1962 | Spears | 248—206 X |
| 3,059,952 | 10/1962 | Wittman et al. | 248—206 X |
| 3,184,264 | 5/1965 | Ealey et al. | 160—368 |

DAVID J. WILLIAMOWSKY, *Primary Examiner.*

P. C. KANNAN, *Assistant Examiner.*